A. PUTNAM.
Corn-Planter.
No. 58,135 — Patented Sept. 18, 1866.
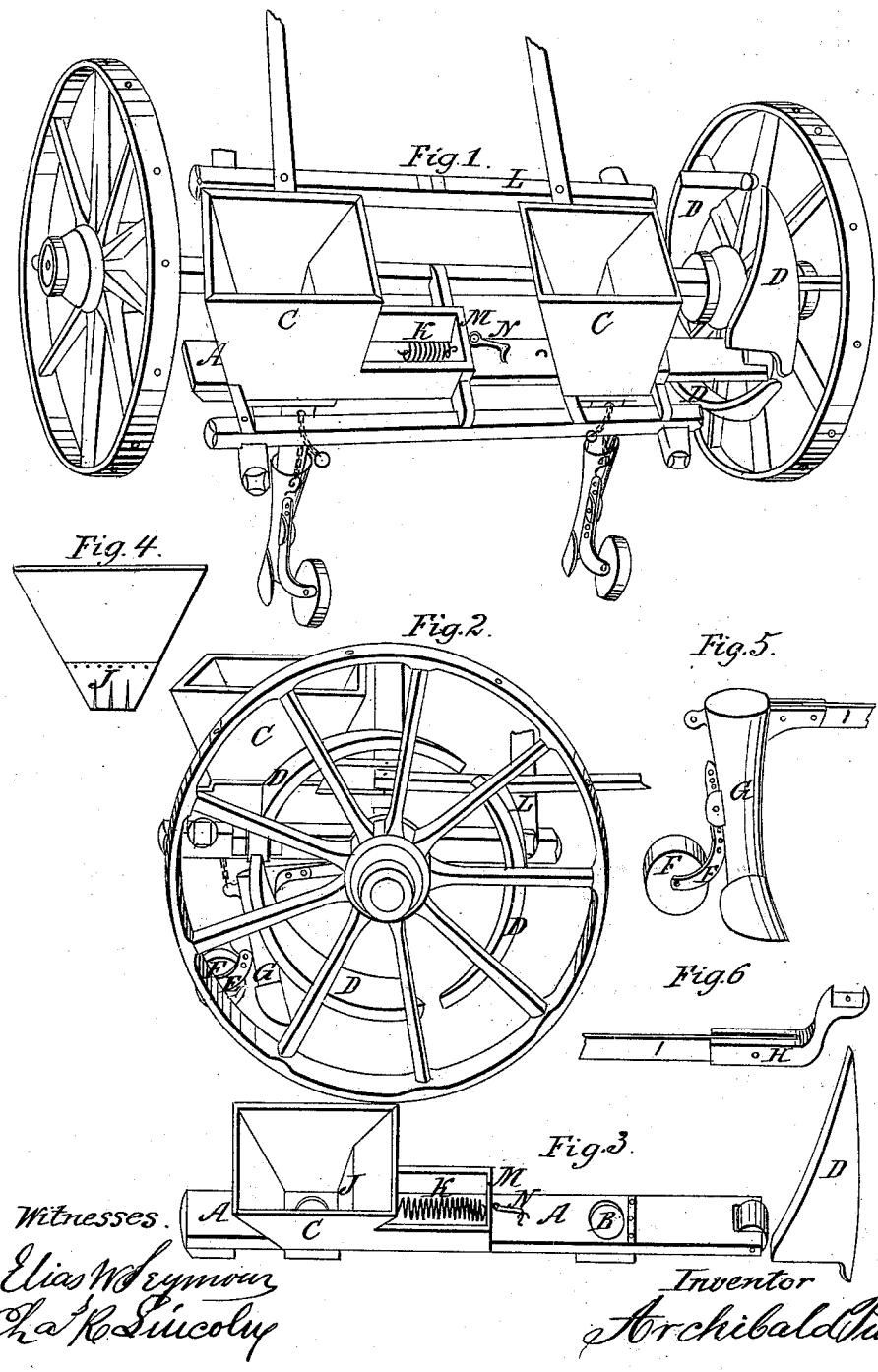

UNITED STATES PATENT OFFICE.

A. PUTNAM, OF OWEGO, NEW YORK.

IMPROVEMENT IN CORN-PLANTERS.

Specification forming part of Letters Patent No. 58,135, dated September 18, 1866.

*To all whom it may concern:*

Be it known that I, ARCHIBALD PUTNAM, of Owego, in the county of Tioga and State of New York, have invented a new and useful Machine for Planting Corn and other Seeds, called the "Tioga Corn-Planter;" and I do hereby declare that the following is a full, clear, and exact description of the construction and operation of the same, reference being had to the annexed drawings, making a part of this specification, in which—

Figure 1 is a perspective view; Fig. 2, a longitudinal elevation; Fig. 3, a transverse section. Figs. 4, 5, and 6 are detached sections.

The nature of my invention consists in the construction of a machine for planting corn and other seeds that will drop at regular intervals, and cover the same any reasonable depth that the operator may choose to plant.

To enable others skilled in the art to make and use my invention, I will proceed to describe its construction and operation.

I construct my machine by placing one or more hoppers, C, between two wheels, as shown at Fig. 1, with a dropping-bar, A, with one or more feed-holes, B, through the same, passing or sliding back and forth through or into the lower part of the hopper C, resting upon the bottom of the same, which will be seen forms a bottom to the hole B, thus making a regular cup, as shown at Fig. 3.

The hole B is carried into the hopper C by means of a cam, D, attached to the back side of the wheel O, which communicates with the end of the bar A, and as the wheel O passes around the cam D moderately forces the bar A from its position seen at Fig. 1 to that shown at Fig. 3, thus charging the cup B with its seed preparatory to dropping it outside of the hopper C.

The cup B, with its contents, is forced outside of the hopper C with a quick motion by means of a spiral spring, K, attached to a cross-piece, M, that passes over the dropping-bar A, and from thence to the bar A in the direction of the hopper C, and as the cam D passes by a given point the pressure of the expanded spring K forces the dropping-bar A endwise sufficient to move the cup B from its place upon the bottom of the hopper C to the outside, thus dropping its contents from the hole B beneath into the opening that communicates with the ground.

As the cups B are forced out of the hopper C, as above described, they pass under a rubber spring, J, or its equivalent, which forms the lower part of one end of the hopper C, as shown at Fig. 4.

The use of the spring J is for the purpose of preventing the seed from catching between the lower edge of the hopper C and the edge of the cup B as it passes out, without which spring J the machine would be useless.

The spring J also serves as a strike to equalize the amount of seed at every dropping.

The operation of the dropping arrangement is shut off by sliding the bar A into the hopper C and retaining it there by means of a hook, N, attached to the cross-piece M, as shown at Fig. 3.

The planting and covering are done by the arrangement of one or more hollow teeth, G, similar to those used in grain-drills, with the exception of a roller, F, and slide-bar, E, which slides up and down through a groove in the rear of the tooth G, which is for the purpose of regulating the depth of the planting, as shown in Figs. 1, 2, and 5.

The tooth G is attached in an upright position to an iron bar, *i*, that is connected with the front cross-bar, L, by the means of an iron head, H, with an upright slot, corresponding with the thickness of bar *i*, so as to allow it a free movement up and down, as shown at Fig. 6.

What I claim as my improvement, and desire to secure by Letters Patent, is—

1. The drill-tooth G, wheel F, and adjustable slide-bar E, arranged and operating as described.

2. In combination with the above, the arrangement of the cams D, bar A, spring K, and valve J, as and for the purpose specified.

ARCHIBALD PUTNAM.

Witnesses:
ELIAS W. SEYMOUR,
CHAS. R. LINCOLN.